(12) United States Patent
Mitterreiter et al.

(10) Patent No.: US 11,486,740 B2
(45) Date of Patent: Nov. 1, 2022

(54) ANGLE MEASURING DEVICE AND METHOD FOR OPERATING AN ANGLE MEASURING DEVICE

(71) Applicant: DR. JOHANNES HEIDENHAIN GmbH, Traunreut (DE)

(72) Inventors: Johann Mitterreiter, Chieming (DE); Sebastian Gruber, Kirchdorf (DE); Alois Bartlechner, Palling (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 384 days.

(21) Appl. No.: 16/920,348

(22) Filed: Jul. 2, 2020

(65) Prior Publication Data
US 2021/0003393 A1 Jan. 7, 2021

(30) Foreign Application Priority Data
Jul. 4, 2019 (DE) ..................... 10 2019 209 866.5

(51) Int. Cl.
*G01B 11/27* (2006.01)
*G01B 3/56* (2006.01)
(Continued)

(52) U.S. Cl.
CPC .......... *G01D 5/24485* (2013.01); *G01B 3/56* (2013.01); *G01B 7/31* (2013.01); *G01B 11/27* (2013.01); *G01D 5/34792* (2013.01)

(58) Field of Classification Search
CPC ... G01B 3/56; G01B 7/30; G01B 7/31; G01B 11/27; G01D 5/2451; G01D 5/34738; G01D 5/34792; G01D 5/24485; G01D 2205/90
See application file for complete search history.

(56) References Cited

U.S. PATENT DOCUMENTS 5,057,684 A * 10/1991 Service .............. G01D 5/24442
250/231.13
5,708,496 A * 1/1998 Barnett .............. G01D 5/34738
356/28
(Continued)

FOREIGN PATENT DOCUMENTS

| DE | 102006020067 A1 | 12/2006 |
|----|----|----|
| EP | 2500696 A1 | 9/2012 |
| NO | 2018/150833 A1 | 8/2018 |

OTHER PUBLICATIONS

European Search Report issued in corresponding European Application No. EP 20165305.2 dated Sep. 8, 2020, pp. 1-2.

*Primary Examiner* — Sang H Nguyen
(74) *Attorney, Agent, or Firm* — Carter, DeLuca & Farrell LLP

(57) ABSTRACT

An angle measuring device includes first and second component groups and a bearing. The first component group includes a scale element having a first graduation. The second component group has a first modular unit, including a position sensor, and a second modular unit, including first, second, and third position transducers, and a compensation coupling. The first and second modular units are connected in a torsionally stiff but axially and radially flexible manner. The angle measuring device is operable in first and second modes. In the first mode, the first graduation is scannable by the position sensor to determine a first angular position. In the second mode, the first graduation or a further graduation situated on the scale element is scannable by the position transducers to determine further angular positions. A corrected relative angular position is determinable based on the first angular position and the further angular positions.

17 Claims, 6 Drawing Sheets

(51) Int. Cl.
    *G01B 7/31*     (2006.01)
    *G01D 5/244*     (2006.01)
    *G01D 5/347*     (2006.01)

(56) References Cited

U.S. PATENT DOCUMENTS

| | | | | |
|---|---|---|---|---|
| 5,786,646 | A * | 7/1998 | Newberg | G01P 1/00 |
| | | | | 310/68 B |
| 5,859,425 | A * | 1/1999 | Mleinek | G01D 11/245 |
| | | | | 250/239 |
| 7,205,530 | B2 * | 4/2007 | Jones | G01D 11/16 |
| | | | | 250/239 |
| 7,469,478 | B2 * | 12/2008 | Mitterreiter | G01D 5/34738 |
| | | | | 33/645 |
| 7,601,948 | B1 * | 10/2009 | Setbacken | G01D 5/24442 |
| | | | | 250/231.13 |
| 9,146,136 | B2 | 9/2015 | Watanabe | |
| 11,187,516 | B2 * | 11/2021 | Mitterreiter | G01B 7/30 |
| 2006/0043964 | A1 | 3/2006 | Watanabe et al. | |
| 2019/0390984 | A1 | 12/2019 | Oohata | |
| 2020/0370927 | A1 * | 11/2020 | Watanabe | G01D 5/347 |

\* cited by examiner

ANGLE MEASURING DEVICE AND METHOD FOR OPERATING AN ANGLE MEASURING DEVICE

CROSS-REFERENCE TO RELATED APPLICATIONS

The present application claims priority to Application No. 10 2019 209 866.5, filed in the Federal Republic of Germany on Jul. 4, 2019, which is expressly incorporated herein in its entirety by reference thereto.

FIELD OF THE INVENTION

The present invention relates to an angle measuring device, e.g., having a scale element for measuring a corrected relative angular position, and to a method for operating an angle measuring device.

BACKGROUND INFORMATION

Angle measuring devices of this type can be installed on spindles or rotary tables, for example. These spindles or rotary tables are frequently used in machining equipment or machining centers. Spindles or motor spindles in machine tools quite often hold a rotating tool such as a milling tool. Workpieces which are then processed by chip removal, for example, are fixed in place on rotary tables. In addition, rotary tables are used in measuring machines, in which case a workpiece that is fastened to the rotary table is measured. Angle measuring devices are used especially in machine tools or measuring machines for measuring rotatory movements. There is a growing demand to increase the capability of such spindles or rotary tables, in particular to increase the precision during the operation.

European Published Patent Application No. 2 500 696 describes an angle measuring device that has a plurality of scanning heads and is able to carry out a self-calibration method.

SUMMARY

Example embodiments of the present invention provide an angle measuring device that allows for an extremely precise determination of an angular position. In addition, example embodiments of the present method provide a method for operating an angle measuring device that allows for a highly precise determination of an angular position.

According to an example embodiment of the present invention, an angle measuring device includes a first component group, a second component group, and a bearing. The component groups are positioned so that they are able to rotate relative to each other about an axis of rotation through the bearing or with the aid of the bearing. The first component group includes a scale element, which has a first graduation. The second component group has a first modular unit, which in turn has at least one position sensor. In addition, the second component group has a second modular unit, which has a first, second, and third position transducer. The second component group furthermore has a compensation coupling. The position sensor and the first, the second, and the third position transducer are situated opposite the scale element separated by an air gap in each case. The first modular unit is connected with the aid of the compensation coupling to the second modular unit in a torsionally stiff but axially and radially flexible manner, so that the position sensor is situated in a torsionally stiff yet axially and radially flexible manner relative to the position transducers. The angle measuring device is configured such that it is able to be operated in a first mode and in a second mode. In the first mode, the position sensor is able to scan the first graduation in order to determine a first angular position. In the second mode, the position transducers are able to scan the first graduation or a further graduation which is situated on the scale element in order to determine a further angular position. A corrected relative angular position between the component groups is able to be determined based on the first angular position and the further angular positions.

It should be understood that torsionally stiff indicates that the position of the position sensor relative to the position transducers with regard to the circumferential direction remains unchanged also under the usual loading of the compensation coupling. In contrast, because of the axial and radial flexibility of the compensation coupling, there is a change in the position of the position sensor relative to the position transducers during a usual loading of the compensation coupling. The position sensor is particularly situated so that it is (axially and radially) unable to move relative to the scale element.

It should further be understood that position sensor and position transducer express that these components may be installed on different modular units. The respective components (e.g., position sensor, position transducer) may have a different or an identical configuration.

The position sensor allows for an absolute determination of an angular position of the scale element with respect to the second component group within and across a rotation. For example, this may be achieved in that the first graduation has an absolute code track or else in that a reference mark is applied to the scale element, which allows for an absolute determination of the angular position within a rotation in conjunction with an incremental graduation.

The position sensor is able to be positioned opposite the scale element separated by an air gap that extends in the radial or axial direction. In the same or similar manner, position transducers may be placed opposite the scale element separated by an air gap that extends in the radial or axial direction, with the size of the respective air gap possibly varying in such a case as a result of load-related displacements, shifting or tilting under a deformation of the compensation coupling.

The first graduation and the optional, additional graduation may include regular structures that are situated in parallel next to one another along a first direction. The first direction has a directional component in the circumferential direction.

The second component group may have a light source, and the first graduation and the position sensor may be arranged such that the relative angular position between the component groups is able to be determined by an optical principle.

At least two of the position transducers may be arranged at an offset under a center angle about the axis of rotation of at least 90°. Accordingly, the first position transducer, for instance, is therefore disposed at an offset under a center angle about the axis of rotation of at least 90° relative to the second or relative to the third position transducer. A center angle should be understood as a central angle, with the particular center point lying on the axis of rotation.

At least three of the position transducers and optionally also the position sensor may be situated along a circular line. However, it is also possible that the first, the second, the third, and the fourth position transducer (optionally with the position sensor) are situated along a circular line.

The scale element may have a further graduation, and the scale element may be arranged such that the first graduation is able to be scanned according to an optical principle and the further graduation according to a magnetic principle. The first graduation and the further graduation may be at least partially positioned in a superposed manner. For example, the first graduation and the further graduation may be applied to a lateral side of a cylindrical scale element, and the first graduation and the further graduation may have a superposed arrangement with regard to the axial direction.

The second component group may include a housing, and the position sensor as well as the position transducers may be arranged inside the housing.

According to an example embodiment of the present invention, in a method for operating an angle measuring device, the angle measuring device is operable in a first mode and in a second mode. In the first mode, the first graduation is scanned by the position sensor in order to determine a first angular position, and in the second mode, the first graduation or a further graduation situated on the scale element is scanned by the position transducers in order to determine a further angular position in each case. Moreover, a corrected relative angular position between the component groups is determined in the second mode, the corrected relative angular position being based on the first angular position and the further angular positions.

A correction value may be generated from the further angular positions determined in the second mode, which is used in the first mode together with the measured first angular position to generate the corrected relative angular position.

A correction value may be ascertained based on the measured further angular positions and stored (in particular in the angle measuring device).

In the second mode, the scale element may be rotated across at least 360°, in particular across at least 720°, about the axis of rotation.

The angle measuring device may be configured to be sequentially operated in the first mode and in the second mode or else simultaneously in the first and in the second mode.

The first, second, and third position transducers may be adapted to scan the first graduation or the further graduation in order to determine a displacement of the scale element in a plane.

In addition, the fourth, fifth, and sixth position transducers are able to scan the second graduation in order to determine an axial position of the scale element.

The angle measuring device may have a memory component, which may be used as a data logger for storing information that is based on the signals generated by the position sensor and/or the position transducers.

At least the first or the further graduation (or both graduations) may be applied on a lateral surface of a cylindrical scale element.

The first component group may optionally include a scale element that has not only the first graduation but also a second graduation. The second graduation may be scanned by the fourth, fifth, and sixth position transducers. The fourth, fifth, and sixth position transducers are able to determine tilting of the scale element and thus tilting of the axis of rotation about a tilting axis. The second graduation includes regular structures that are situated in parallel next to one another along a second direction. The second direction has a directional component in the axial direction. In addition, the second graduation may be arranged as an incremental graduation or as an absolute graduation. By providing an absolute graduation, the axial position of the scale element is also able to be determined directly after the angle measuring device is switched on (in particular without a reference operation), which may be beneficial in temperature-related axial displacements of the scale element, for example.

The first direction along which the regular structures of the first graduation or the further graduation are arranged next to one another may be identical with the circumferential direction. In the same or similar manner, the first direction may be inclined or disposed at a slant in relation to the circumferential direction (but not perpendicular to the circumferential direction). In the same or similar manner, the second direction along which the regular structures of the second graduation are arranged next to one another may be identical with the axial direction (and thus be situated parallel to the axis of rotation). Similarly, the second direction may be inclined or be situated at a slant with respect to the axial direction (but not perpendicular to the axial direction). The regular structures of the first graduation and the second graduation, for instance, may have an arrow-like orientation with respect to one another.

The displacement of the scale element in the plane may be determined using a magnetic principle. In this case, the structures of the graduation of the scale element are particularly arranged as magnetic structures, e.g., as a locally defined series of magnetic north and south poles. In this configuration, the position sensor and/or the position transducers are arranged as magnetic sensors. The position sensor and/or the position transducers, for instance, may operate on the basis of a magneto-resistive principle or be arranged as Hall-effect position transducers. Alternatively, the position transducers may also be based on an optical or inductive measuring principle, but a combination of the measuring principles is possible as well, so that the first graduation is able to be scanned according to a different principle than the second graduation.

An annular body, for example, which is able to be fastened to a driving collar, may be used as a scale element. However, it is alternatively also possible to apply the first and/or the second graduation or a further graduation directly on the driving collar.

The position sensor and the position transducers may be electrically connected to an electronic component, the electronic component being able to determine the angular position of the scale element, the displacement or the position of the scale element in the plane perpendicular to the axis of rotation, and the tilting of the scale element. In addition, the electronic component is optionally also able to determine the axial position.

For spindles or rotary tables, which by nature have a correspondingly stiff configuration, such tilting is relatively minor and lies in ranges of less than one angular minute relative to the ideal axis of rotation, e.g., 100 angular minutes down to 50 angular minutes. Such tilting thus also causes only minimal changes in position so that the position transducers must have a very high resolution in order to provide reliable measurements or quantitative values with regard to the tilting. Since the axis of rotation may possibly rotate, the described tilting may lead to wobbling motions of the scale element, the wobbling motions being quantitatively recordable by the angle measuring device, especially also under consideration of the measured angular position.

The position transducers may have a resolution of, for example, less than 2 µm, in particular of less than 1 µm, and in particular less than 750 nm. These values for the resolutions are able to be achieved both for determining the axial and the lateral positions, that is to say, in the plane perpendicular to the axis of rotation.

The first graduation or a further graduation situated on the scale element may be scanned by the first, second, and third position transducers in order to determine a further angular position in each case. Based on the acquired further angular positions, a displacement of the scale element in the plane is determined or calculated.

The angle measuring device thus not only makes it possible to detect an angular position but also axis displacements of a rotary table, for example, in an online manner. In particular, based on the measured values of the angular position and the position of the scale element in the plane perpendicular to the axis of rotation, it is possible to use a numerical control to correct the setpoint position during the machining or measuring process. The position of a workpiece, for instance, is therefore able to be corrected during the machining process. More specifically, the angle measuring device may be configured such that correction values are produced in an interaction with a numerical control which are based on the position data measured by the angle measuring device in conjunction with the absolute angular position.

In other words, with the aid of an angle measuring device arranged in the foregoing manner, shifting or movements of the scale element or the axis of rotation in the remaining five degrees of freedom are thus able to be detected in quantitative terms as a function of a measured angular position.

Further features and aspects of example embodiments of the present invention are described in more detail below with reference to the appended Figures.

DETAILED DESCRIPTION

Figure 1:
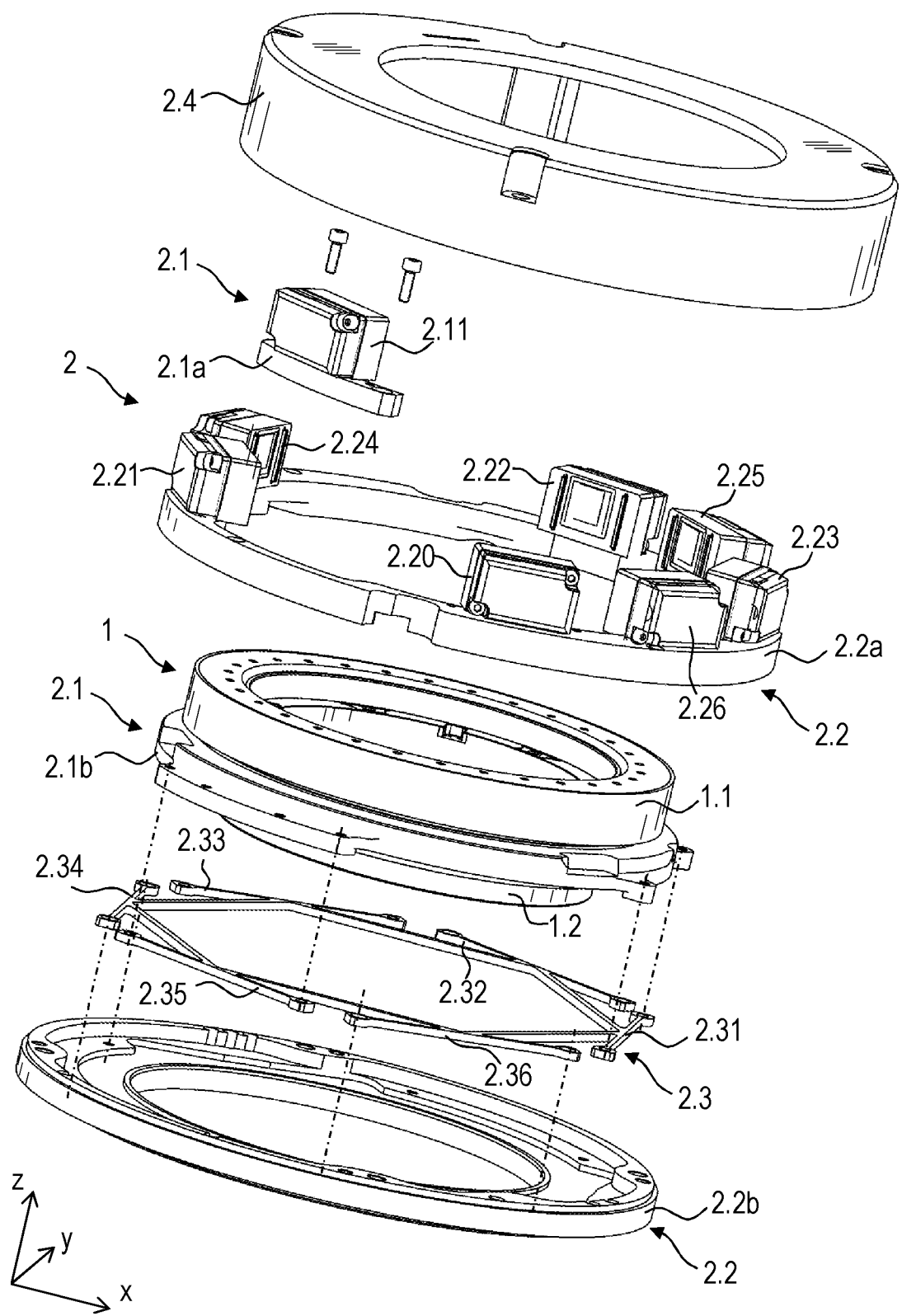
FIG. 1 is an exploded view of an angle measuring device.
Figure 2:
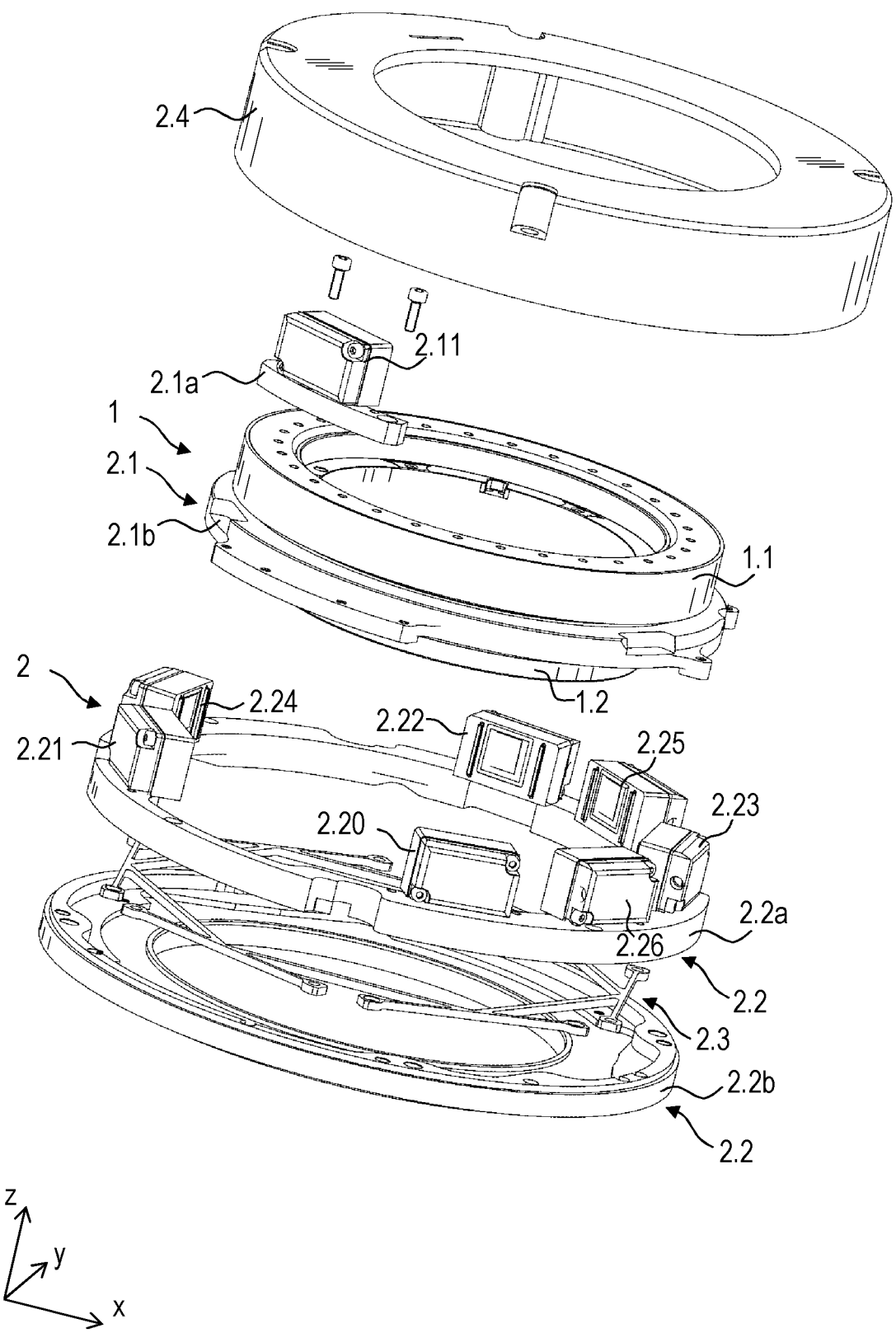
FIG. 2 is a further exploded view of the angle measuring device.

FIGS. 1 and 2 are exploded views of an angle measuring device, or angle encoder, as it may be installed on a rotary table axle of a machine tool such as a milling machine, for instance. The angle measuring device includes a first component group 1 and a second component group 2. According to FIG. 3, first component group 1 is rotatable about an axis of rotation A relative to second component group 2, so that first component group 1 may function as a rotor and second component group 2 may consequently also be referred to as a stator. In addition, the angle measuring device illustrated in FIG. 4 also includes a bearing 3, which is arranged as a rolling bearing, for example.

Figure 4:
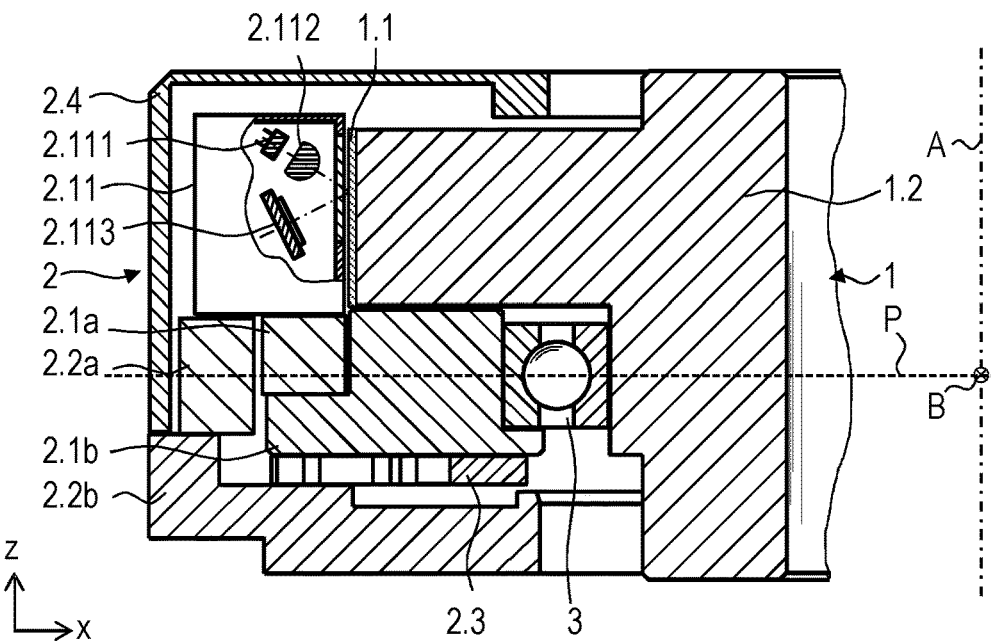
FIG. 4 a partial cross-sectional view of the angle measuring device.
Figure 5:
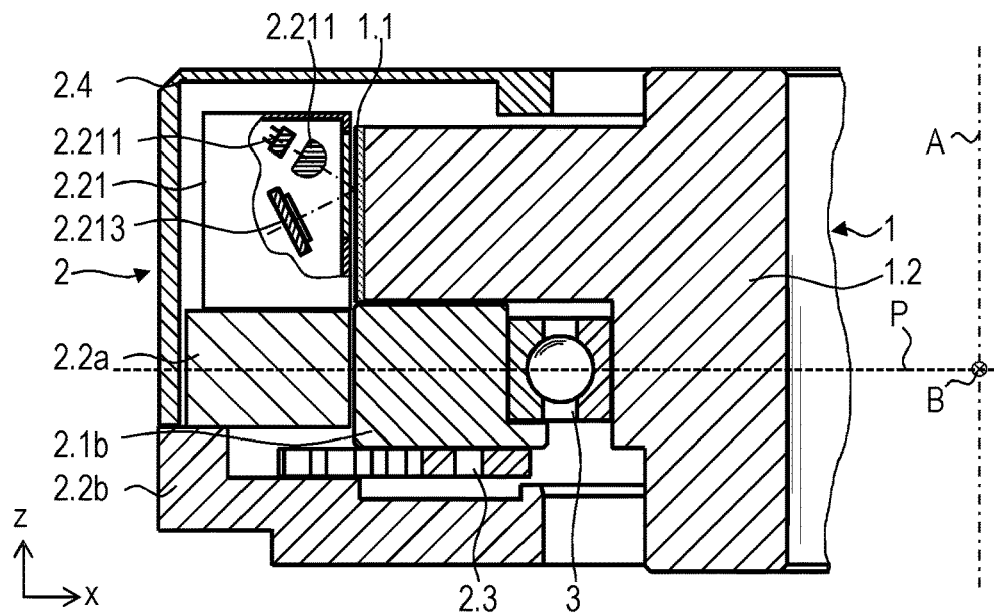
FIG. 5 is a further partial cross-sectional view of the angle measuring device.

First component group 1 has a scale element 1.1, which is fixed in place in a torsionally fixed manner on a driving collar 1.2 (see FIG. 4 or 5, for example). Driving collar 1.2 is used for the accommodation of a shaft of a rotary table, for example, so that the shaft is connected to driving collar 1.2 in a rigid and torsionally fixed manner.

Second component group 2 has a first modular unit 2.1, which includes two parts and thus includes a first part 2.1a, which may be referred to as fastening jaws, for example, and a second part 2.1b, which may be referred to as a bearing plate. Fastened to first part 2.1a is a position sensor 2.11, which is situated opposite scale element 1.1 separated by a radial air gap (see FIG. 4).

In addition, the second component group 2 has a second modular unit 2.2, which likewise includes two parts. Second modular unit 2.2 therefore includes a first part 2.2a and a second part 2.2b, which may also be referred to as a flange, for example. A plurality of position transducers 2.20 to 2.26 is mounted directly on first part 2.2a, which is arranged as a retaining ring. According to FIG. 5, position transducers 2.20 to 2.26 are situated opposite scale element 1.1 separated by a radial air gap. The angle measuring device includes a first position transducer 2.21, a second position transducer 2.22, a third position transducer 2.23, a fourth position transducer 2.24, a fifth position transducer 2.25, a sixth position transducer 2.26, and a seventh position transducer 2.20. Position transducers 2.20 to 2.26 are situated at an offset from one another in circumferential direction u in each case.

Second component group 2 includes a compensation coupling 2.3. Compensation coupling 2.3 is used to compensate for displacements due to inherent production and assembly inaccuracies. With the aid of compensation coupling 2.3, first modular unit 2.1 is connected to second modular unit 2.2 in a torsionally stiff but axially and radially flexible manner. In the illustrated exemplary embodiment, first part 2.1b of first modular unit 2.1 is connected to three tabs 2.31, 2.33, 2.35 of compensation coupling 2.3 using screw connections, which are indicated in FIG. 1 by dash-dot lines, for example. In contrast, second part 2.2b of second modular unit 2.2 is connected to the three other tabs 2.32, 2.34, 2.36 of compensation coupling 2.3. In this manner, position sensor 2.11 is situated in a torsionally stiff but axially and radially resilient or flexible manner relative to the plurality of position transducers 2.20 to 2.26.

After compensation coupling 2.3 has been connected to first modular unit 2.1 and second modular unit 2.2 in the afore-described manner, first part 2.2a is able to be connected to second part 2.2b of second modular unit 2.2 with the aid of screws. Position sensor 2.11 as well as position transducers 2.20 to 2.26 are axially situated at the level of scale element 1.1.

Referring FIG. 1, the installation situation of compensation coupling 2.3, in particular, is to be illustrated, while FIG. 2 is meant to illustrate the situation with regard to second modular unit 2.2, which includes first part 2.2a and second part 2.2b. In the course of the assembly, second modular unit 2.2 is axially moved over second part 2.1b of first modular unit 2.1.

In addition, second component group 2 includes a housing 2.4, which is connected to second part 2.2b of second modular unit 2.2 and is usually rigidly fixed in place on a machine component for the measuring operation. Housing 2.4 is provided to protect the interior of the angle measuring device from environmental influences. In this context, seals may be provided between driving collar 1.2 and housing 2.4.

As described above, driving collar 1.2 is connected in a rigid and torsionally fixed manner to a rotatable shaft during the proper operation of the angle measuring device, and the housing or second part 2.2b of second modular unit 2.2 is connected to a stationary machine component. Eccentricities, wobbling motions, or axial displacements of the shaft relative to the machine component cause reaction forces in the angle measuring device, in particular in bearing 3. Compensation coupling 2.3, which is flexible or elastically deformable in the radial and axial directions, is provided to restrict the magnitude of the reaction forces. On the other hand, compensation coupling 2.3 is torsionally stiff so that the accuracy of the measurement of the angular position is not adversely affected. Position sensor 2.11 is rigidly connected to second part 2.1b of first modular unit 2.1. A deformation of compensation coupling 2.3 has no effect on the position of position sensor 2.11 relative to scale element 1.1. In contrast, position transducers 2.20 to 2.26 are (axially and radially) displaceable relative to scale element 1.1 within the scope of the elasticity of compensation coupling 2.3.

In the illustrated exemplary embodiment, position sensor 2.11 as well as position transducers 2.20 to 2.26 have a substantially identical configuration and are all disposed along a circular line. FIG. 4 is a cross-sectional view which includes position sensor 2.11 (through line D-D in FIG. 3), while FIG. 5 is a cross-sectional view which includes a position transducer 2.21 (through line F-F in FIG. 3) of position transducers 2.20 to 2.26. Each of the respective position transducers 2.11, 2.21 includes an LED 2.111, 2.211, a capacitor 2.112, 2.212, and a sensor element 2.113, 2.213. In this case, sensor element 2.113, 2.213 includes, or is arranged as, what is generally referred to as an opto-ASIC on a circuit board. LED 2.111, 2.211 serving as a light source transmits light through capacitor 2.112, 2.212 onto scale element 1.1. LED 2.111, 2.211, capacitor 2.112, 2.212, and sensor element 2.113, 2.213 are allocated to the second component group 2 of angle measuring device, i.e., to the stator. In the illustrated exemplary embodiment, each position transducer 2.11, 2.20 to 2.26 has a housing in which corresponding sensor elements 2.113, 2.213 are arranged. As an alternative, it is also possible to dispense with the housing, or multiple sensor elements may also be situated in one and the same housing. For example, a plurality of, or all, position transducers 2.11, 2.20 to 2.26 may also be mounted on one and the same circuit board.

Figure 6:
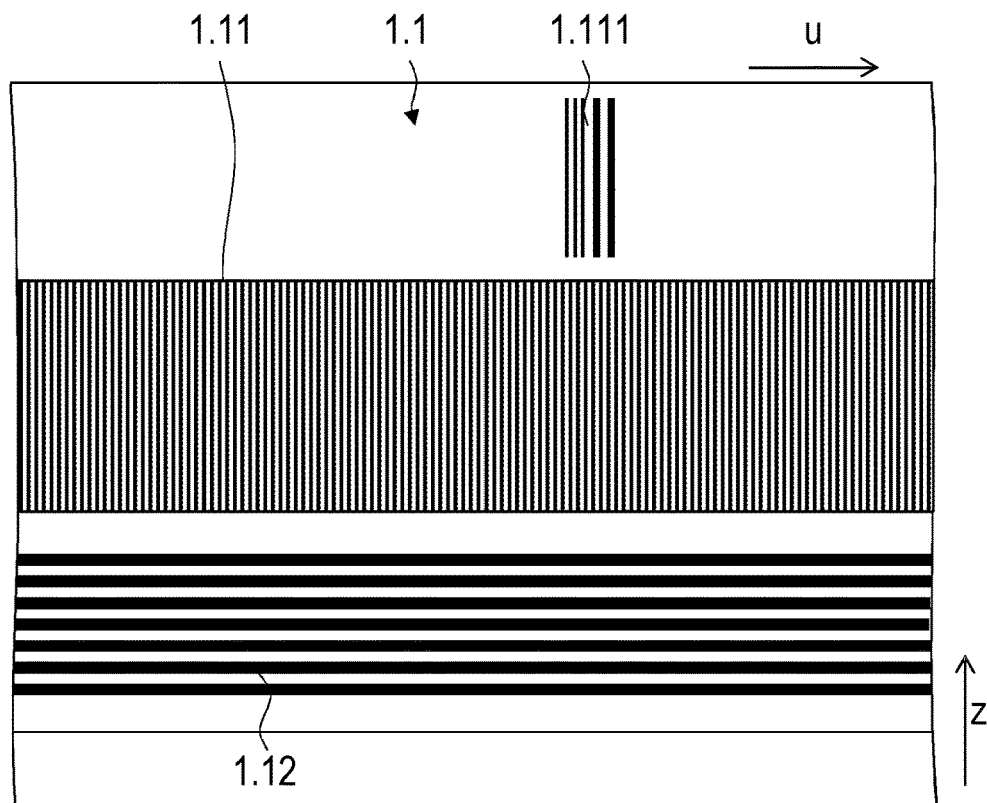
FIG. 6 is an enlarged view of a scale element of the angle measuring device.

In contrast, as already mentioned, scale element 1.1 is fastened to rotatable driving collar 1.2. As illustrated in FIG. 6, scale element 1.1 includes a first graduation 1.11 as well as a second graduation 1.12. In the illustrated exemplary embodiment, scale element 1.1 is arranged as a cylindrical or annular body on whose lateral side both second graduation 1.12 and first graduation 1.11 are situated, with second graduation 1.12 being disposed at an offset from first graduation 1.11 with regard to the axial direction z.

FIG. 6 illustrates a section of a lateral surface of scale element 1.1. Second graduation 1.12 includes regular structures or lines, which are situated in parallel next to one another along a second direction, with the second direction having a directional component in the axial direction. In the illustrated exemplary embodiment, the second direction is identical with axial direction z.

First graduation 1.11 includes regular structures or lines that are situated in parallel next to one another along a second direction, the second direction having a directional component in the axial direction. In the illustrated exemplary embodiment, the second direction extends parallel to axis of rotation A or parallel to direction z. In addition, first graduation 1.11 includes a reference mark 1.111.

In other words, first graduation 1.11 encompasses regular structures, which are arranged as lines, for example, that are oriented in the second direction and disposed in parallel with one another. In the illustrated exemplary embodiment, the second direction extends parallel to axis of rotation A or parallel to direction z. Second graduation 1.12 likewise includes regular structures, which are arranged circumferentially, for example, and whose circumferential longitudinal sides are oriented in the first direction and situated parallel to one another. The first direction extends in circumferential direction u.

In the illustrated exemplary embodiment, the structures of first graduation 1.11 and those of second graduation 1.12 are arranged as stripes that are reflective and non-reflective to light. Scale element 1.1 is able to modulate the irradiated light by its first graduation 1.11 according to the angular position of scale element 1.1 or driving collar 1.2. With the aid of second graduation 1.12, the irradiated light is modulated according to the axial position of scale element 1.1 or driving collar 1.2. As illustrated in FIGS. 4 and 5, the modulated light finally impinges upon photodetectors of sensor elements 2.113, 2.213.

Figure 3:
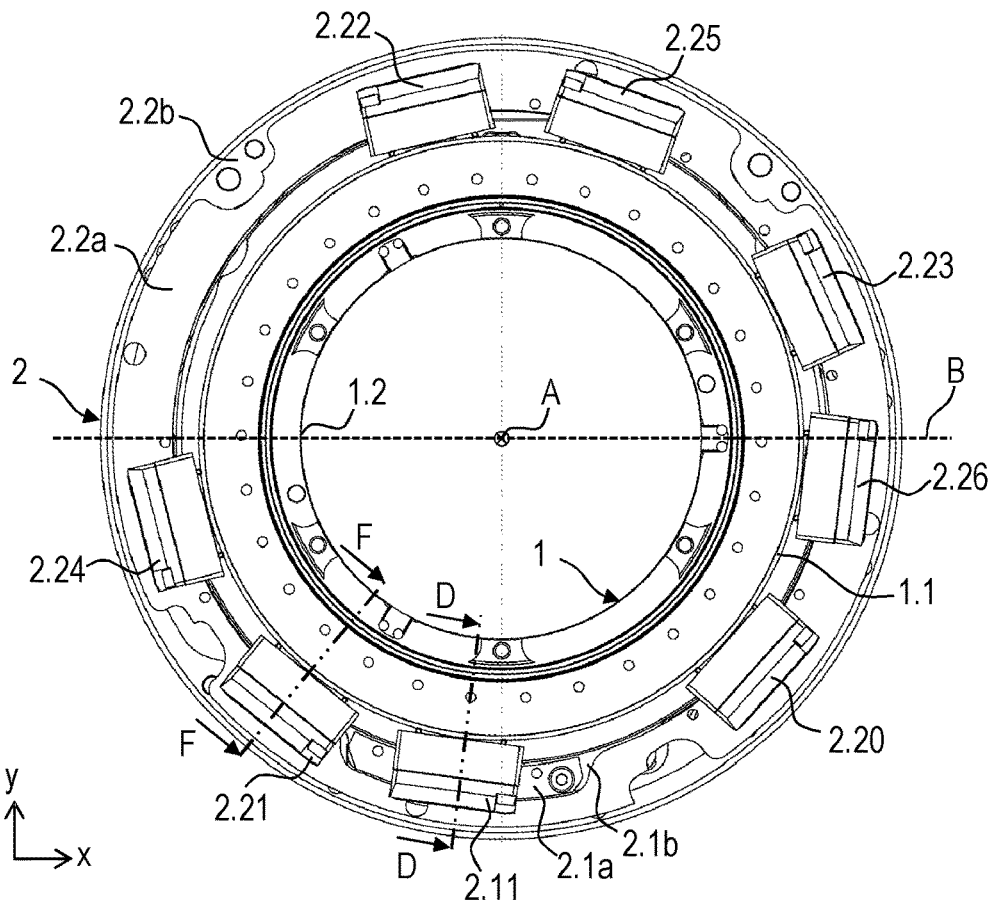
FIG. 3 is a top view of the angle measuring device.

Position transducers 2.20 to 2.26 are electrically connected to an electronic component. As illustrated in FIG. 3, position transducers 2.20 to 2.26 are in principle arranged in a pairwise manner (first pair 2.21, 2.24, second pair 2.22, 2.25, third pair 2.23, 2.26). In the illustrated exemplary embodiment, first graduation 1.11 is scanned by first position transducer 2.21, second position transducer 2.22, and third position transducer 2.23. Second graduation 1.12 is scanned by fourth position transducer 2.24, fifth position transducer 2.25, and sixth position transducer 2.26, and these position transducers 2.24, 2.25, 2.26 are able to determine the axial position of scale element 1.1. Position transducer 2.20, which is not part of one of the aforementioned pairs, is also used for scanning first graduation 1.11.

Figure 7:
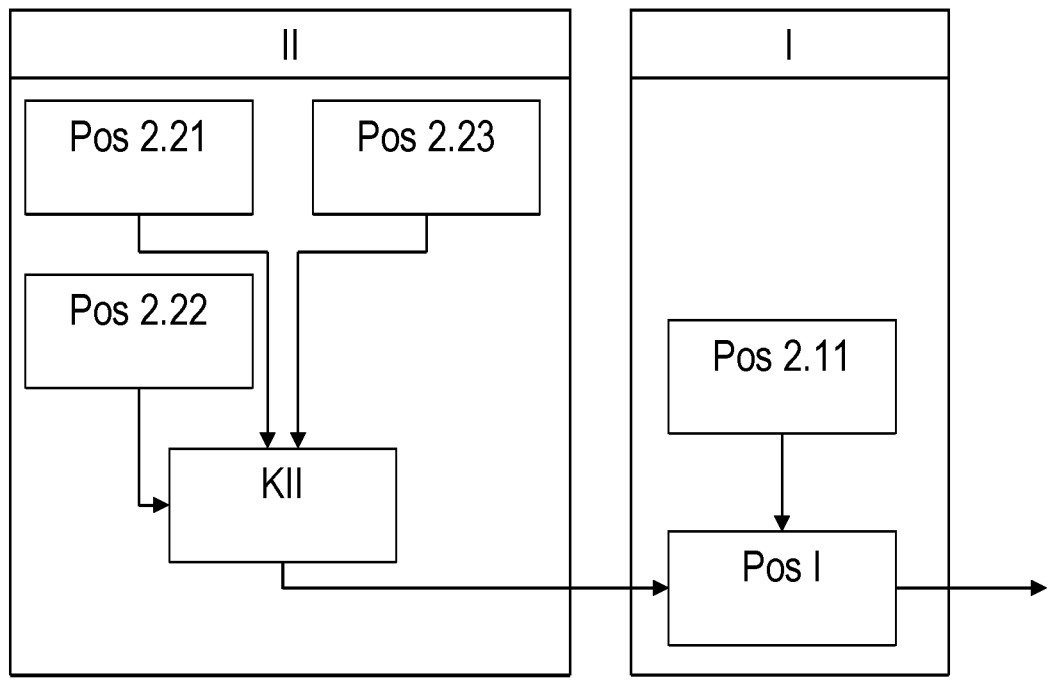
FIG. 7 is a flow diagram of a method for operating an angle measuring device.
Figure 8:
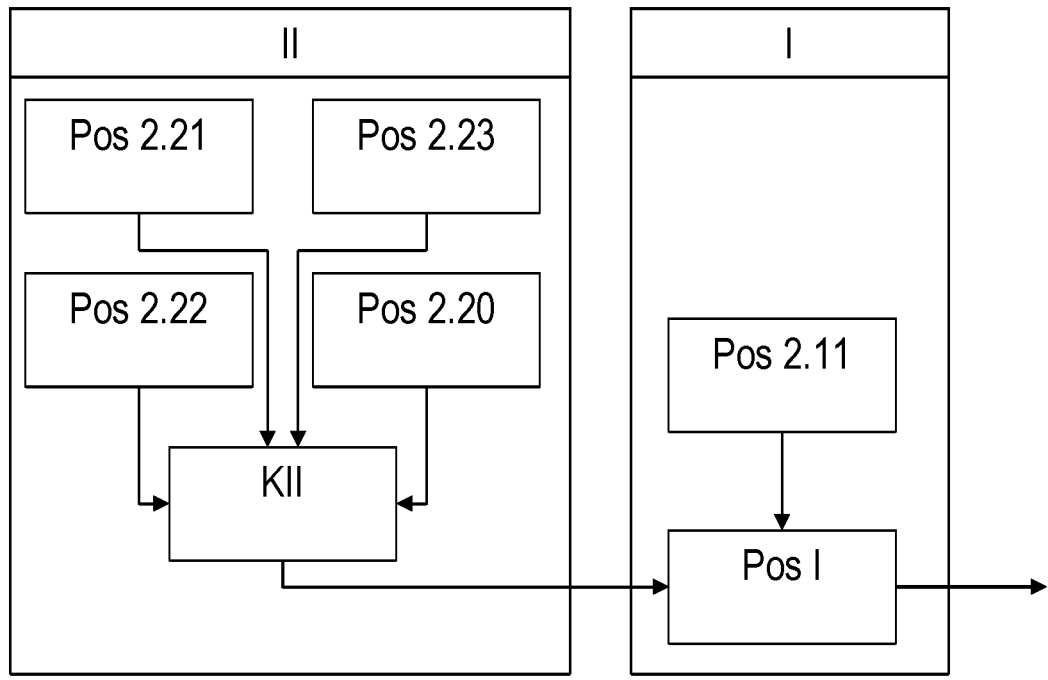
FIG. 8 is a flow diagram of a method for operating an angle measuring device according to a further variant.

As illustrated in FIGS. 7 and 8, the respective angle measuring device may optionally be operated in a first mode I or in a second mode II, and it is possible for the angle measuring device to be operated in both modes I, II at the same time, or in consecutive time intervals in only one mode I, II. First mode I may be considered as the actual measuring mode whereas second mode II may also be referred to as a calibration mode. In second mode II, a calibration operation is performed. For example, the angle measuring device is able to be set to second mode II in predefined operating time intervals or after a certain number of rotations in each case or after the angle measuring device is switched on.

First graduation 1.11 is scanned by first position transducer 2.21, second position transducer 2.22, and third position transducer 2.23. During the calibration operation, scale element 1.1 is rotated by at least 360°. Each of the three position transducers 2.21, 2.22, 2.23 measures what is referred to as further angular positions Pos 2.21, Pos 2.22, Pos 2.23 (see FIG. 7). Based on the measured further angular positions Pos 2.21, Pos 2.22, Pos 2.23, a correction value KII is ascertained in the electronic component and stored in the angle measuring device or in a control unit.

In first mode I, position sensor 2.11 scans first graduation 1.11 such that a first angular position Pos 2.11 of scale element 1.1 in relation to position sensor 2.11 is determined with the aid of position sensor 2.11. First angular position Pos 2.11 is able to be determined in absolute terms within and across a rotation. For this purpose, as illustrated in FIG. 6, an in principle incremental first graduation 1.11 may be used by which an absolute first angular position Pos 2.11 is able to be generated across a rotation in conjunction with reference mark 1.111. Alternatively, first graduation 1.11 may have an absolute configuration, e.g., be arranged as a pseudo random code or Gray code, within the sense of an encoding, i.e., be equipped to generate a unique code value. The signals of position sensor 2.11 are conveyed to an electronic component which is fixed in place in a suitable location in second component group 2. The particularly digital values of first angular position Pos 2.11 are generated by the electronic component. Together with measured first angular position Pos 2.11 and using correction value KII, a corrected relative angular position Pos I between component groups 1, 2 is calculated in first mode I in the electronic component and output as a measuring result.

Because of the described use of correction values KII, deformations of scale element 1.1 that may occur during the operation of the angle measuring device, for example, are able to be corrected such that a high measuring accuracy of the angular position is still ensured.

The correction method may be improved in that not only first position transducer 2.21, second position transducer 2.22, and third position transducer 2.23 are used for scanning first graduation 1.11, but a fourth position transducer 2.24 is used in addition. In this case too, scale element 1.1 is rotated by at least 360° during the calibration operation. Each of the four position transducers 2.20, 2.21, 2.22, 2.23 measures further angular positions Pos 2.20, Pos 2.21, Pos 2.22, Pos 2.23, as illustrated in FIG. 8. Based on measured further angular positions Pos 2.20, Pos 2.21, Pos 2.22, Pos 2.23, a correction value KII is ascertained in the electronic component and stored in the angle measuring device or in a control unit. This correction value KII is utilized in first mode I for correcting the measured first angular position Pos 2.11 so that the component calculates a corrected angular position Pos I between component groups 1, 2 and is able to output it as a measuring result.

A suitable linkage of the position signals of first position transducer 2.21, second position transducer 2.22, and third position transducer 2.23 in the electronic component allows for a determination of the position of scale element 1.1 in a plane P, which is oriented perpendicular to axis of rotation A, that is to say, the x, y coordinates of the actual position of axis of rotation A. This position, which may also be referred to as the lateral position, depends on the loading of the individual rotary table during the machining. In addition, corrected angular position Pos I of driving collar 1.2 is allocated to the current lateral position.

With the aid of the angle measuring device and a suitable linkage of the position signals of fourth position transducer 2.24, fifth position transducer 2.25, and sixth position transducer 2.26, it is also possible to determine the extent of the tilting of scale element 1.1 about a tilting axis B that lies in a plane P, and also the extent and the direction of wobbling motions. Plane P is oriented perpendicular to axis of rotation A.

Using the angle measuring device, it is possible, in particular in the case of rotary tables, to determine the absolute angular position of driving collar 1.2 and to measure the lateral and axial position of driving collar 1.2 as a function of the absolute angular position. Because the mentioned rotary tables have a very stiff construction, position measurements that lie in a µm range or lower may be performed in this case. A high resolution is therefore required, in particular of position sensor 2.11 and position transducers 2.20 to 2.26. In the same or similar manner, tilting of axis of rotation A relative to housing 2.4 about tilting axis B is able to be measured.

The further processed position signals are output via a cable to an additional device such as a control device of a machine.

In the above-described exemplary embodiment, position sensor 2.11 as well as position transducers 2.20 to 2.26 are thus position transducers which sense an angular position and/or an axial position.

Figure 9:
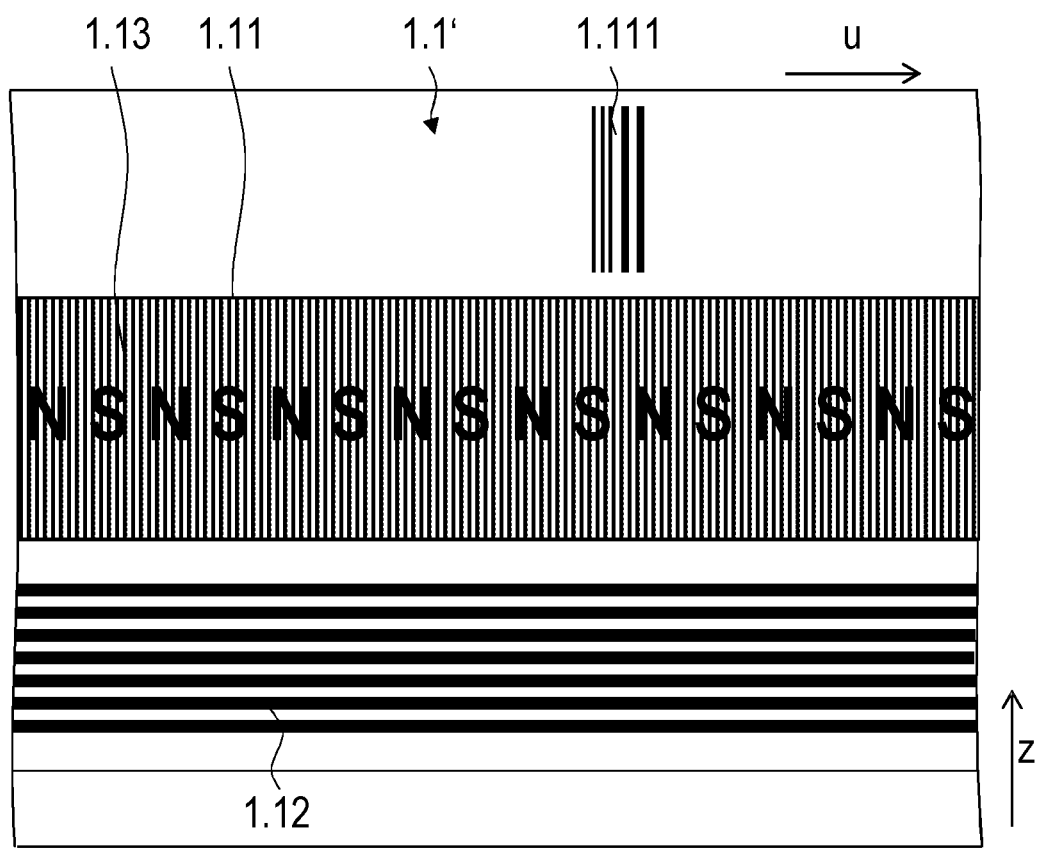
FIG. 9 is an enlarged view of a scale element of the angle measuring device according to a further exemplary embodiment.

Referring, for example, to FIG. 9, a further exemplary embodiment is described. FIG. 9 illustrates a lateral view of a scale element 1.1'. Scale element 1.1' includes a first graduation 1.11, which corresponds to that of the above-described exemplary embodiment. In addition, first graduation 1.11 includes a reference mark 1.111. The structures of first graduation 1.11 and reference mark 1.111 are arranged as stripes that are reflective and non-reflective to light, analogous to the above-described exemplary embodiment. In the same or similar manner, the second graduation is arranged analogous to the above-described exemplary embodiment.

However, according to the further exemplary embodiment, scale element 1.1' has a further graduation 1.13. It includes regular structures or lines that are arranged in parallel next to one another along the first direction, with the first direction having a directional component in circumferential direction u. The first direction is identical with circumferential direction u. The structures of further graduation 1.13 are arranged as magnetic north and south poles. First graduation 1.11 and further graduation 1.13 are at least partially superposed.

As illustrated in FIG. 4, position sensor 2.11 is able to scan first graduation 1.11 according to an optical principle while the position transducers operate according to a magnetic principle. As a result, the first angular position Pos 2.11 is optically acquired in the further exemplary embodiment, and further angular positions Pos 2.20, Pos 2.21, Pos 2.22, Pos. 2.23, Pos 2.24, Pos 2.25, Pos 2.26 are acquired with the aid of a magnetic principle.

What is claimed is:

1. An angle measuring device, comprising:
    a first component group, including a scale element having a first graduation;
    a second component group including a first modular unit having a first position sensor, a second modular unit having a first position transducer, a second position transducer, and a third position transducer, and a compensation coupling; and
    a bearing, the first component group and the second component group rotatable relative to each other about an axis of rotation via the bearing;
    wherein the position sensor and the position transducers are arranged opposite the scale element separated by an air gap;
    wherein the first modular unit is connected to the second modular unit by the compensation coupling in a torsionally stiff but axially and radially flexible manner, so that the position sensor is arranged in a torsionally stiff but axially and radially flexible manner relative to the position transducers;
    wherein the angle measuring device is adapted to be operated in a first mode and in a second mode;
    wherein the position sensor is adapted to scan, in the first mode, the first graduation to determine a first angular position;
    wherein each position transducer is adapted to scan, in the second mode, the first graduation or a further graduation provided on the scale element to determine a respective further angular position; and wherein the angle measuring device is adapted to determine a corrected relative angular position between the first component group and the second component group based on the first angular position and the further angular positions.

2. The angle measuring device according to claim 1, wherein the second component group includes a light source, the first graduation and the position sensor being arranged such that the relative angular position between the first component group and the second component group is optically determinable.

3. The angle measuring device according to claim 1, wherein at least two of the position transducers are arranged at an offset under a center angle about the axis of rotation of at least 90°.

4. The angle measuring device according to claim 1, wherein at least three position transducers are arranged along a circular line.

5. The angle measuring device according to claim 1, wherein the scale element includes a further graduation, the first graduation being optically scannable, the further graduation being magnetically scannable.

6. The angle measuring device according to claim 1, wherein the second component group includes a housing, the position sensor and the position transducers being arranged inside the housing.

7. The angle measuring device according to claim 1, wherein the first position transducer, the second position transducer, and third position transducer are adapted to scan the first graduation or a further graduation provided on the scale element to determine a displacement of the scale element in a plane.

8. A method for operating an angle measuring device, as recited in claim 1, comprising:
    operating the angle measuring device in a first mode, in which the first graduation is scanned by the position sensor to determine a first angular position;
    operating the angle measuring device in a second mode, in which the first graduation or a further graduation arranged on the scale element is scanned by the position transducers to determine respective further angular positions; and
    determining a corrected relative angular position between the first component group and the second component group based on the first angular position and the further angular positions.

9. A method for operating an angle measuring device that includes a first component group, a second component group, and a bearing, the first component group and the second component group being rotatable relative to each other about an axis of rotation via the bearing, the first component group including a scale element having a first graduation, the second component group including a first modular unit, having a position sensor, a second modular unit, having a plurality of position transducers, and a compensation coupling, the position sensor and the position transducers being arranged opposite the scale element separated by an air gap, the first modular unit being connected to the second modular unit by the compensation coupling in a torsionally stiff but axially and radially flexible manner, so that the position sensor is arranged in a torsionally stiff but axially and radially flexible manner relative to the position transducers, comprising:
    operating the angle measuring device in a first mode, in which the first graduation is scanned by the position sensor to determine a first angular position;
    operating the angle measuring device in a second mode, in which the first graduation or a further graduation arranged on the scale element is scanned by the position transducers to determine respective further angular positions; and
    determining a corrected relative angular position between the first component group and the second component group based on the first angular position and the further angular positions.

10. The method according to claim 9, further comprising generating a correction value from the further angular positions determined in the second mode, wherein the correction value is used in the first mode together with the first angular position to determine the corrected relative angular position.

11. The method according to claim 9, further comprising ascertaining and storing a correction value based on the further angular positions.

12. The method according to claim 9, wherein, in the second mode, the scale element is rotated by at least 360° about the axis of rotation.

13. The method according to claim 9, wherein, in the second mode, the scale element is rotated by at least 720° about the axis of rotation.

14. The method according to claim 9, wherein the angle measuring device is sequentially operated in the first mode and in the second mode.

15. The method according to claim 9, wherein the measuring device is simultaneously operated in the first mode and in the second mode.

16. The method according to claim 9, further comprising:
    scanning, by a first position transducer, a second position transducer, and a third position transducer, the first graduation or a further graduation provided on the scale element to determine a further angular position; and
    determining a displacement of the scale element in a plane based on the determined further angular position.

17. The method according to claim 9, wherein a fourth position transducer, a fifth position transducer, and a sixth position transducer scan a second graduation to determine an axial position of the scale element.

* * * * *